United States Patent [19]

Ballu

[11] Patent Number: 4,529,129
[45] Date of Patent: Jul. 16, 1985

[54] MOBILE APPARATUS FOR SPRAYING A LIQUID FOR THE TREATMENT OF PLANTS

[75] Inventor: Patrick J. Ballu, Reims, France

[73] Assignee: Tecnoma, Epernay, France

[21] Appl. No.: 531,741

[22] Filed: Sep. 13, 1983

[30] Foreign Application Priority Data

Sep. 13, 1982 [FR] France .................. 82 15421

[51] Int. Cl.³ .................. B05B 1/20; G05G 11/00
[52] U.S. Cl. .................. 239/164; 239/159; 74/479
[58] Field of Search .................. 239/159, 164–168; 74/479; 414/917

[56] References Cited

U.S. PATENT DOCUMENTS 3,223,330 12/1965 La Plante .................. 239/168

FOREIGN PATENT DOCUMENTS 1298775 7/1969 Fed. Rep. of Germany ...... 239/159
2014834 9/1979 United Kingdom .................. 239/164

Primary Examiner—Andres Kashnikow
Assistant Examiner—James R. Moon, Jr.
Attorney, Agent, or Firm—Watson, Cole, Grindle & Watson

[57] ABSTRACT

The invention relates to a mobile apparatus for spraying a plant treatment liquid. This apparatus comprises a support member carried by a tractor or trailer vehicle. A rectangular framework is suspended from the support member through an articulated link rod, a ball joint and an articulated component, for instance an articulated parallelogram. Two rigid components of variable length, for instance two jacks, are interposed, the first one between the rectangular framework and the articulated link rod, and the second one between the support member and the articulated component. The length of each rigid component is adjusted in operation so that the lateral sides of the rectangular framework are always parallel to and equidistant from the longitudinal plane of symmetry of the vehicle.

11 Claims, 2 Drawing Figures

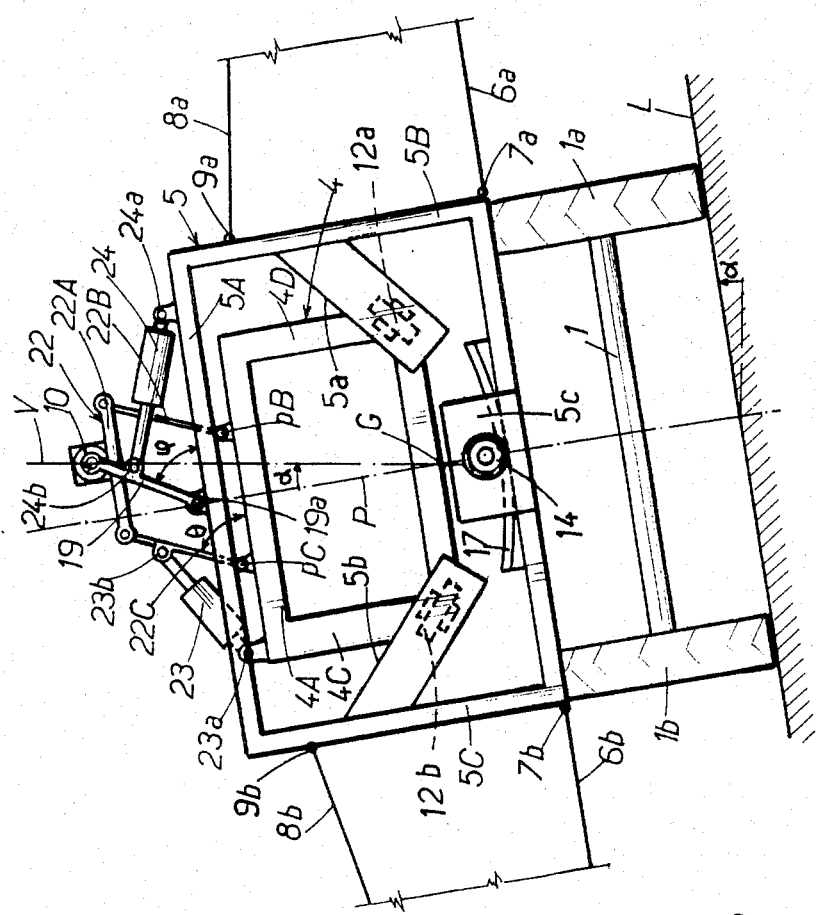
FIG.:2
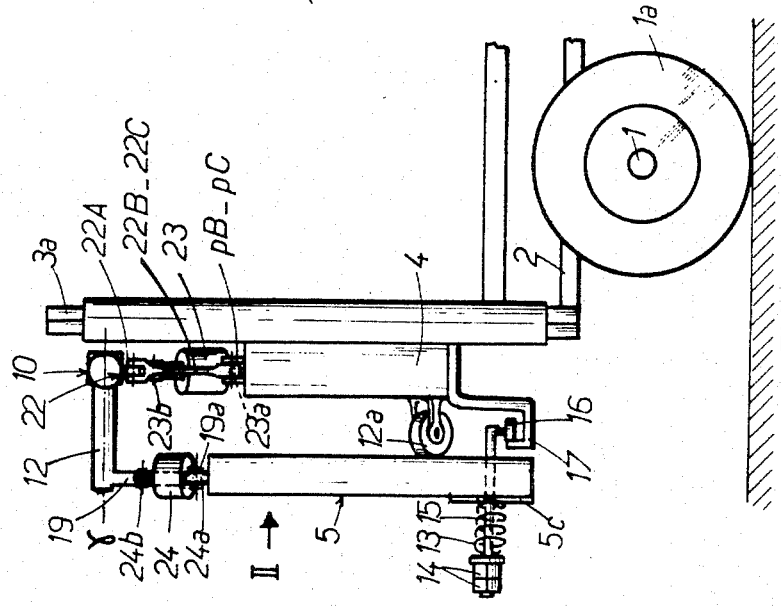
FIG.:1

MOBILE APPARATUS FOR SPRAYING A LIQUID FOR THE TREATMENT OF PLANTS

The invention relates to a mobile apparatus for spraying a plant treatment liquid.

One of the embodiments of such a mobile apparatus for spraying, which is described in French Patent Application No. 82/01,418 and illustrated particularly in FIG. 5 thereof, comprises a support frame carried by a tractor or trailer vehicle in a position at right angle to the direction of the forward movement of the vehicle, a rectangular framework suspended from the support frame through the intermediacy of a ball joint carried by the support frame, and of an articulated link rod interposed between the ball joint and the middle of the upper side of the rectangular framework. In addition, at least one rigid component of variable length, such as a jack, is interposed between the ball joint or the support frame, which is fixed integrally to the vehicle, and a point on the rectangular framework which is well separated from the corresponding articulation of the link rod.

In this embodiment, described in the aforementioned patent application, the adjustment over the length of the rigid component, for example of the jack, makes it possible to keep the lateral sides of the rectangular framework always parallel to the longitudinal plane of symmetry of the vehicle when it is operating and, consequently, to keep the lateral spraying racks, which are fixed to the lateral sides of the said rectangular framework, substantially at right angle to the longitudinal plane of symmetry of the vehicle. As a result, for example when the vehicle carrying or towing the mobile spraying apparatus is moving in the direction at right angle to the line of the steepest gradient of sloping ground, its longitudinal plane of symmetry being consequently substantially at right angle to this line, the arrangement just cited enables, through a suitable adjustment to the length of the rigid component, the lateral spraying racks to be kept constantly substantially parallel to the line of the steepest gradient of the ground and, consequently, equidistant from the latter at all the points of the spraying racks. This arrangement therefore makes it possible to carry out spraying of plants growing on sloping ground as efficiently and uniformly as in the case of plants growing on ground which is substantially horizontal.

This embodiment, described in the aforesaid patent application, has, however, the following disadvantage: when the vehicle towing or carrying the mobile spraying apparatus moves over sloping ground across its lines of steepest gradient, the adjustment of the length of the rigid component which is suitable for keeping the lateral sides of the rectangular framework substantially parallel to the longitudinal plane of symmetry of the vehicle also has the effect of displacing the said rectangular framework relative to the support frame, which is solidly fixed to the vehicle, in the direction of the line of steepest gradient of the ground with the result that the two lateral spraying racks cease to be equidistant from the longitudinal plane of symmetry of the vehicle; the areas of the ground which receive the sprayed liquid are therefore no longer symmetrical relative to the path of movement of the vehicle which leads, on the one hand, to a loss of sprayed liquid and, on the other hand, to the absence of spraying on a strip of ground adjoining the path of movement.

The principal object of the present invention is to remedy this last disadvantage.

The mobile apparatus for spraying a plant treatment liquid according to the present invention is of the aforementioned type; it is characterised in that the ball joint by means of which the rectangular framework is carried by the support frame is itself mounted on the upper part of a component whose lower part is articulated on the upper side of the said support frame, and in that an additional rigid component of variable length, such as a jack, has its ends articulated respectively on the support frame and on the articulated component, the lengths of the rigid components being adjusted in operation so that the lateral sides of the rectangular framework are always parallel to the longitudinal plane of symmetry of the vehicle and equidistant from this plane.

By virtue of this arrangement according to the present invention, both lateral spraying racks are kept always equidistant from the longitudinal plane of symmetry of the vehicle, whether the latter travels over horizontal ground or over sloping ground, across its lines of steepest gradient, thereby avoiding, in the latter case, any loss of spraying liquid or the absence of spraying on a strip of the ground adjoining the path of movement of the vehicle.

In a preferred embodiment of the apparatus according to the inventions the distance between the upper and lower articulations of the articulated component is substantially equal to the length of the articulated link rod. The upper sides of the support frame, which is fixed integrally to the vehicle, and of the rectangular framework, which is movable relative to this support frame, are thereby kept constantly parallel to each other during operation and are moreover substantially kept equidistant from the ground. As a result, the lateral spraying racks, which are fixed to the rectangular framework, are themselves kept always equidistant from the ground, whether the latter is horizontal or sloping, which further favours the uniformity and the efficiency of the spraying which is obtained.

As an example, an embodiment of the mobile apparatus according to the present invention, comprising two lateral spraying racks suspended at the rear of the carrying vehicle, is described below and illustrated diagrammatically in the attached drawing.

FIG. 1 is a view of this embodiment in elevation and partial section, also showing the rear axle of the carrying vehicle.

FIG. 2 is a simplified view in the direction of the arrow II of the FIG. 1, in the case when the carrying vehicle is moving at right angle to the lines of the steepest gradient of sloping ground.

In FIGS. 1 and 2, 1 refers to the sole or rear axle of the carrying vehicle, whose wheels are indicated by 1*a* and 1*b*. 2 indicates the rear part of the chassis of the carrying vehicle, which may be an agricultural tractor or a trailer, particularly a trailer carrying a large tank (not shown) for plant treatment liquid. A substantially rectangular support frame 4, for example of welded metal beams, is mounted so as to slide on posts such as 3*a* (not shown in FIG. 2), which are themselves welded to the rear part 2 of the chassis of the vehicle at right angles to its axle 1. A jack makes it possible to move the frame 4 vertically on posts such as 3*a*.

An articulated parallelogram 22, formed by three link rods 22A to 22C has its lateral sides 22B and 22C, which are of equal length, articulated by their lower ends at two points pB and pC of the upper side 4A of the support frame 4, these points being equidistant from the longitudinal plane of symmetry P (FIG. 2) of the vehicle. A ball joint 10 is mounted in the middle of the upper side 22A of the articulated parallelogram 22. As can be seen in the diagrammatic side view of FIG. 1, the side 22A of the articulated parallelogram 22 is fixed integrally to the casing of the joint 10 whose ball is itself fixed integrally to one end of a support beam 12, the other end of which is fixed to the upper end of a vertical link rod 19. The lower end 19a of the link rod 19 is itself articulated to the middle of the upper side 5A of a rectangular framework 5 whose plane is parallel to that of the support frame 4.

A first rigid component of variable length, in particular a jack 23, has its ends articulated, one at 23a to a point of the upper side 4A of the support frame 4, which is more distant from its middle than the articulation pC, particularly near the left-hand end, in FIG. 2, of the said upper side 4A, while the other side of the jack 23, particularly that of its shank, is articulated at 23b to the articulated parallelogram 22, particularly to its lateral side 23C. A second rigid component of variable length, particularly a second jack 24, also has its ends articulated, one at 24a to a point of the upper side 5A of the rectangular framework 5, distant from its middle 19a, and in particular close to the right-hand end of the said upper side 5A, while the other end of the jack 24, and particularly that of its shank, is articulated at 24b to an intermediate point of the link rod 19.

Two lateral spraying racks 6a and 6b, which can be of any type, are fixed to the lateral sides 5B and 5C of the rectangular framework 5, for example at right angles to its lateral sides, as can be seen in FIG. 2. Stays 8a and 8b can be provided to support the ends of the spraying racks 6a and 6b.

Near the lower corners of the rear face of the rectangular frame 4 are two roller wheels 12a and 12b which are mounted, for example in clevises, so as to turn freely. When the planes of the frame 4 and of the framework 5 are parallel to each other, the roller wheels 12a and 12b can roll on appropriate rolling surfaces 5a and 5b (FIG. 2) mounted on the rear face of the said rectangular framework 5 and fixed integrally, for example, to its lateral sides. The roller wheels 12a and 12b, or at least their rims, are preferably made of an elastic material which ensures good shock absorption, for example rubber, elastomer, synthetic material or the like. Furthermore, a helical spring 13 is compressed between, on the one hand, a plate-shaped component 5c which is integrally fixed to the lower side of the rectangular framework 5 and, on the other hand, a nut and lock-nut pair 14 screwed on one end of a threaded rod 15; the other end of the rod 15 passes freely through the plate 5c and extends close to the rectangular frame 4, where the said end of the rod 15 carries an idle roller wheel 16; the latter can roll, practically without axial displacement, in a rolling track 17 which, in the embodiment being considered, is formed by a U-section beam, one flange of which is welded, for example, near the lower edge of the rectangular frame 4, while its other flange, which is substantially parallel to the plane of the frame 4, prevents escape of the said roller wheel 16. The rolling track 17 can be flat or curved into an arc of a circle centred on the horizontal axis $\gamma$ of the ball joint 10.

The mobile spraying apparatus according to the present invention, which has just been described, is employed in the following manner.

When the carrying vehicle is moving on a horizontal plane, its longitudinal plane of symmetry P being consequently vertical, the extended length of the shank of the jack 23 is adjusted so that the lateral sides 22B and 22C of the articulated parallelogram 22 are also vertical with the result that the ball joint 10, which is fixed in the middle of its upper side 22A, is also centred in the plane P. The extended length of the shank of the jack 24 is furthermore adjusted so that the link rod 19, that is to say its longitudinal axis, is substantially perpendicular to the upper side 5A of the rectangular framework 5. The rigid assembly formed by the components 5-6a-6b-19-24 can then swing freely, pendulum-wise, underneath the ball joint 10, the corresponding swinging movements of the rectangular framework 5 being limited and guided relative to the support frame 4 by the components 12a, 13, 14, 15, 16 and 17, as described in French Patent Application No. 82/01,418. By virtue of this arrangement, the rectangular framework 5 can swing pendulum-wise around the horizontal axis $\gamma$ passing through the centre of the ball joint 10 in a vertical plane which is substantially parallel to that of the support frame 4 on both sides of an equilibrium position in which the centre of gravity G of the rigid assembly 5-6a-6b-19-24 is located vertically below the ball joint 10. As a result, in this equilibrium position, the upper side 5A of the rectangular framework 5 is substantially horizontal while its lateral sides 5B and 5C, as well as the link rod 9 which is perpendicular to 5A, are substantially vertical; as a consequence the two lateral spraying racks 6a and 6b are, in this equilibrium position, parallel to the surface of the horizontal ground which they spray uniformly on both sides of the path of movement 1a-1b of the carrying vehicle. Naturally, the various advantages related to the pendular suspension of the rectangular framework 5, which carries the spraying racks 6a and 6b, which have been outlined in the aforesaid patent application, are also obtained.

On the other hand, when the carrying vehicle is moving in a direction at right angle to the line of the steepest slope L (FIG. 2) of sloping ground or, more generally, in a direction which is not parallel to L, the extended lengths of the shanks of the jacks 23 and 24 are adjusted, according to the present invention, in the following manner: the jack 23 is adjusted so as to incline the lateral side 22C of the articulated parallelogram 22 at an angle $\theta$, which is smaller than 90 degrees, to the upper side 4A of the support frame 4, which results in the ball joint 10 being displaced by the length $l22.\cos \Gamma$ towards the right of the FIG. 2, $l22$ indicating the lengths of both lateral sides of the articulated parallelogram 22. Next, or at the same time, the jack 24 is adjusted to as to incline the link rod 19 at an angle $\phi$, which is between 0 and 90 degrees, to the side 5A of the rectangular framework 5, so that its lower articulation 19a, and consequently the middle of the upper side 5A of the rectangular framework 5, are brought into the said plane P by virtue of a displacement towards the left of the FIG. 2 with an amplitude of $l19.\cos \phi$, $l19$ being the length of the link rod 19, that is to say the distance between the axes of its two end articulations; this condition for equality of amplitudes, which brings the articulation 19a into the plane P, is expressed by the relationship:

$$l19.\cos \phi = l22.\cos \theta. \tag{1}$$

The equilibrium position of the pendular system should moreover be such that, according to the present invention, the spraying racks 6a and 6b are parallel to the line of the steepest slope L as also is, consequently, the upper side 5A of the rectangular framework 5. If then V indicates the vertical which, in this equilibrium position of the pendular system illustrated in FIG. 2, passes both through the centre of the ball joint 10 and through the centre of gravity G of the pendular assembly, the said vertical V forms an angle $\alpha$ with the plane P which is equal to the gradient of the line L, so that the angle $\phi$ is defined by the condition:

$$(l19.\cos \phi)/(l19.\sin \phi + D) = \tan \alpha. \quad (2)$$

in which D denotes the distance from G to the middle of the side 5A of the rectangular framework 5.

This relationship (2) shows therefore that, in fact, it is the angle $\phi$, and consequently the total length of the jack 24, which must be determined as a function of the gradient $\alpha$ of the line L, the value of the angle $\theta$ being then obtainable from that of the angle from the preceding relationship (1).

Furthermore, it can be easily shown that following the abovementioned adjustments of the lengths of the jacks 23 and 24, there is produced a lowering $\Delta h$ of the rectangular framework 5 relative to the support frame 4, whose value is given by the relationship:

$$\Delta h = l22(1-\sin \theta) - l19(1-\sin \phi). \quad (3)$$

It is possible to avoid the reduction of the distance of the spraying racks 6a and 6b from the ground resulting from the adjustment of the mobile spraying apparatus according to the present invention when working on a gradient of angle $\alpha$, by making the lateral sides 22B and 22C of the articulated parallelogram 22 of a length l22 which is practically equal to the length l19 of the link rod 19. In fact, the relationship (1) above shows that, in this case, $\theta = \phi$, so that, as a consequence of the relationship (3) above, $\Delta h = 0$.

The present invention is not limited to the embodiment described above. It includes all its variations, some of which will be indicated solely by way of examples. The articulated parallelogram 22 could be replaced by a second link rod, on the upper end of which would be mounted the ball joint 10, its lower end being, on the other hand, articulated near the middle of the upper side 4A of the support frame 4. In this case as well, the second link rod would advantageously be of the same length as the first link rod 19. The present invention is also applicable to a mobile apparatus comprising a single spraying rack. The jacks 23 and 24 could be replaced by other rigid components of adjustable length. The hydraulic jacks, however, present the advantage of being remotely controllable from the cab of the carrying vehicle or tractor. The adjustments of their respective lengths could also be easily automated by means of a digital or analog calculator determining the values of the angles $\theta$ and $\phi$ by means of relationships (1) and (2) indicated above, from the ground gradient in the direction across that of the movement of the mobile apparatus, this gradient being, for example, measured and transmitted to the calculator by known automatic means.

I claim:

1. A mobile apparatus for spraying a plant treatment liquid, comprising a support member carried by a tractor or trailer vehicle in a position at a right angle to the direction of the forward movement of the vehicle, a rectangular framework member suspended from the support member through a ball joint carried by said support member and through a first articulated link rod interposed between the ball joint and the middle of the upper side of the rectangular framework member, at least one first rigid component of variable length interposed between the ball joint and a predetermined point of the rectangular framework member, which point is spaced from the corresponding articulation of said link rod, wherein the said ball joint is mounted on the upper part of an articulated component having a lower part articulated on the upper side of the support member, and a second rigid component of variable length, having its ends articulated respectively on said support member and on said articulated component, and means are provided to adjust in operation the lengths of said first and second rigid components so that the lateral sides of the rectangular framework member are always parallel to the longitudinal plane of symmetry of the vehicle and equidistant from this plane.

2. An apparatus according to claim 1, wherein the articulated component is a second link rod on the upper end of which is mounted the ball joint, its lower end being articulated near the middle of the upper side of the support member.

3. An apparatus according to claim 1, wherein the articulated component is an articulated parallelogram near the middle of the upper side of which is mounted the ball joint, the lower ends of its lateral sides being articulated at two points of the upper side of the support member, which are equidistant from its middle.

4. An apparatus according to claim 1, wherein the distance between the upper and lower articulations of the articulated component is substantially equal to the length of the first articulated link rod.

5. An apparatus according to claim 1, wherein the first rigid component of variable length has its ends articulated respectively on the rectangular framework member and on the first articulated link rod.

6. An apparatus according to claim 1, wherein roller wheels are mounted idly on one of the two support and frame members so as to roll normally on rolling surfaces of the other of said two members, and means are provided to bias the roller wheels into contact with said rolling surfaces.

7. An apparatus according to claim 6, wherein the framework member of the spraying rack is suspended from the ball joint by at least one arm which extends from said framework member in the direction of the ball joint and of the support member, and the rolling surfaces are located, when in contact with the roller wheels, in a substantially vertical plane passing between the framework member and the ball joint.

8. An apparatus according to claim 6, wherein the biasing means are elastic means arranged so as normally to push the roller wheels and the rolling surfaces into contact with each other.

9. An apparatus according to claim 6, wherein at least the rim of the roller wheels is of an elastic material.

10. An apparatus according to claim 8, wherein the biasing means comprise a spring compressed between the framework member and a rear end stop which is fixed integrally to a rod which passes freely through said framework member, the other end of said rod carrying an idle roller wheel adapted to roll, without axial displacement, in a rolling track fixed integrally to the support member.

11. An apparatus according to claim 10, wherein the rolling track is curved into an arc of a circle centred on the horizontal axis of the ball joint.

* * * * *